United States Patent [19]

Janocko

[11] Patent Number: 4,961,678
[45] Date of Patent: Oct. 9, 1990

[54] REACTOR COOLANT PUMP HAVING DOUBLE DAM SEAL WITH SELF-CONTAINED INJECTION PUMP MECHANISM

[75] Inventor: David J. Janocko, Forest Hills, Pa.

[73] Assignee: Westinghouse Electric Corp., Pittsburgh, Pa.

[21] Appl. No.: 231,039

[22] Filed: Aug. 12, 1988

[51] Int. Cl.⁵ .............................................. F02G 1/00
[52] U.S. Cl. .................................. 415/170.1; 277/74
[58] Field of Search ........... 415/105, 110, 111, 169 R, 415/169 A, 170.1, 170 A, 113; 277/15, 72 R, 81 R, 94, 70, 74, 75

[56] References Cited

U.S. PATENT DOCUMENTS

| | | | |
|---|---|---|---|
| 2,779,611 | 2/1953 | Wernert | 277/74 |
| 2,835,514 | 3/1954 | McGahan | 277/74 |
| 3,433,489 | 3/1969 | Wiese | 277/81 R |
| 4,093,239 | 6/1978 | Sugahara | 277/72 R |

FOREIGN PATENT DOCUMENTS

| | | | |
|---|---|---|---|
| 224096 | 10/1958 | Australia | 277/74 |
| 1550017 | 7/1969 | Fed. Rep. of Germany | 277/72 R |
| 44-3132 | 4/1965 | Japan | 277/74 |
| 44-1089 | 6/1965 | Japan | 277/74 |
| 57-65899 | 4/1982 | Japan | 415/111 |
| 134437 | 11/1919 | United Kingdom | 277/74 |
| 729327 | 5/1955 | United Kingdom | 415/113 |
| 811299 | 4/1959 | United Kingdom | 277/74 |

Primary Examiner—Robert E. Garrett
Assistant Examiner—Hoang Nguyen
Attorney, Agent, or Firm—J. C. Spadacene

[57] ABSTRACT

A double dam seal in a reactor coolant pump includes an internal mechanism in the seal to pressurize its annulus. In one form, the mechanism is an inclined flow passage incorporated in the rotating runner of the seal having an outlet in communication with the seal annulus and an inlet in communication with reactor coolant water flow within the pump housing and being located on a smaller radius of rotation that the passage outlet. Rotation of the runner causes rotational movement of the passage and any water therein, turning the passage and rotating runner into a centrifugal pump, causing a pressure differential along the passage due to centrifugal effects, and feeding water via the passage outlet to the seal annulus at a pressure above that at the passage inlet. In another form, the mechanism is a tube projecting at an angle from the rotating runner, or a recessed scoop defined in the runner at an angle to, and communicating with a passage having an inlet and outlet at generally the same radius of rotation. The tube or scoop are also at generally the same radius of rotation but extend upstream of the passage inlet. Rotational movement of the tube or scoop with the rotating runner through the reactor coolant water in the seal housing develops a pressure higher at the passage inlet than outlet which, in turn, is supplied by the passage to the double dam seal annulus.

13 Claims, 8 Drawing Sheets

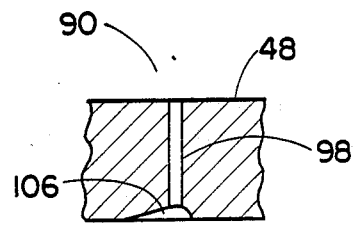
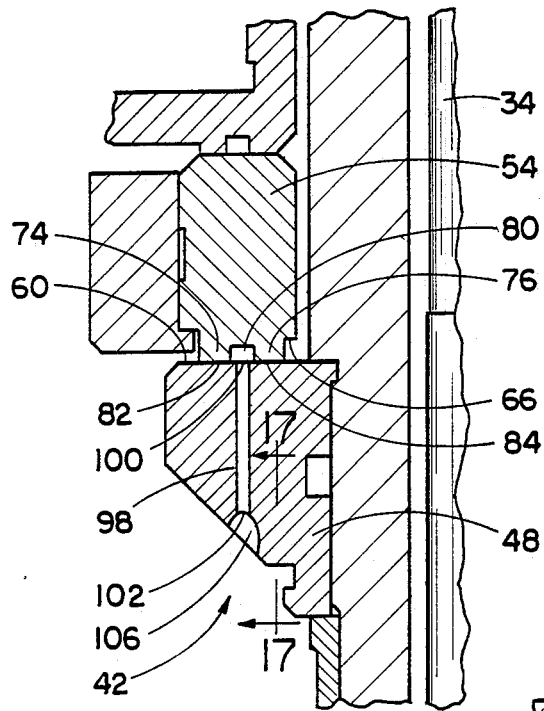
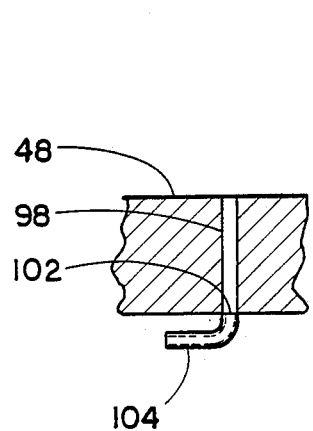
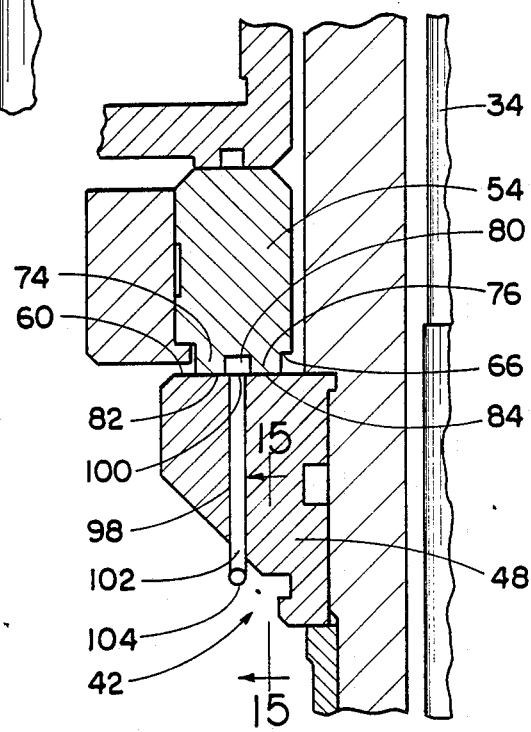

REACTOR COOLANT PUMP HAVING DOUBLE DAM SEAL WITH SELF-CONTAINED INJECTION PUMP MECHANISM

CROSS REFERENCE TO RELATED APPLICATIONS

Reference is hereby made to the following copending applications dealing with related subject matter and assigned to the assignee of the present invention:

1. "Sealing Devices For The Drive Shaft Of A High Pressure Fluid Pump" by N. Bonhomme, assigned U.S. Ser. No. 379,196 and filed May 17, 1982. (W.E. 50,341)

2. "Nuclear Reactor Coolant Pump Impeller/Shaft Assembly" by L. S. Jenkins, assigned U.S. Ser. No. 761,447 and filed Aug. 1, 1985. (W.E. 52,517)

3. "Improved Shaft Seal" by K. P. Quinn, assigned U.S. Ser. No. 739,745 and filed May 31, 1985. (W.E. 52,534)

4. "Reactor Coolant Pump Hydrostatic Sealing Assembly With Improved Hydraulic Balance" by R. F. Guardiani et al, assigned U.S. Ser. No. 063,331 and filed June 17, 1987. (W.E. 53,459)

5. "Reactor Coolant Pump Sealing Surface With Titanium Nitride Coating" by G. Zottola et al, assigned U.S. Ser. No. 035,832 and filed Apr. 8, 1987. (W.E. 53,460)

6. "Reactor Coolant Pump Hydrostatic Sealing Assembly With Externally Pressurized Hydraulic Balance Chamber" by C. P. Nyilas et al, assigned U.S. Ser. No. 91,224 and filed Aug. 31, 1987. (W.E. 53,912)

7. "Reactor Coolant Pump Shaft Seal Utilizing Shape Memory Metal" by D. J. Janocko, assigned U.S. Ser. No. 97,174 and filed May 23, 1988. (W.E. 54,387)

8. "Reactor Coolant Pump Auxiliary Seal For Reactor Coolant System Vacuum Degasification" by J. D. Fornoff, assigned U.S. Ser. No. 222,649 and filed July 21, 1988. (W.E. 54,388)

BACKGROUND OF THE INVENTION

1. Field of the Invention

The present invention relates generally to shaft seals and, more particularly, is concerned with a double dam seal for a reactor coolant pump having a self-contained injection pump mechanism.

2. Description of the Prior Art

In pressurized water nuclear power plants, a reactor coolant system is used to transport heat from the reactor core to steam generators for the production of steam. The steam is then used to drive a turbine generator. The reactor coolant system includes a plurality of separate cooling loops, each connected to the reactor core and containing a steam generator and a reactor coolant pump.

The reactor coolant pump typically is a vertical, single stage, centrifugal pump designed to move large volumes of reactor coolant at high temperatures and pressures, for example 550 degrees F and 2250 psi. The pump basically includes three general sections from bottom to top—hydraulic, shaft seal and motor sections. The lower hydraulic section includes an impeller mounted on the lower end of a pump shaft which is operable within the pump casing to pump reactor coolant about the respective loop. The upper motor section includes a motor which is coupled to drive the pump shaft. The middle shaft seal section includes three tandem sealing assemblies—lower primary, middle secondary and upper tertiary sealing assemblies. The sealing assemblies are located concentric to, and near the top end of, the pump shaft. Their combined purpose is to mechanically contain the high positive pressure coolant of the reactor coolant system from leakage along the pump shaft to the containment atmosphere during normal operating condition. Representative examples of pump shaft sealing assemblies known in the prior art are the ones disclosed in MacCrum U.S. Pat. No. (3,522,948), Singleton U.S. Pat. No. (3,529,838), Villasor U.S. Pat. No.(3,632,117), Andrews et al U.S. Pat. No. (3,720,222) and Boes U.S. Pat. No. (4,275,891) and in the first three patent applications cross-referenced above, all of which are assigned to the same assignee as the present invention.

The lower primary sealing assembly (or No. 1 seal), the main seal of the pump, is a controlled-leakage film-riding face seal. Its primary components are a runner, which rotates with the shaft, and a non-rotating seal ring, which is attached to the lower seal housing. The No. 1 seal causes a pressure drop of coolant water from about 2250 psi to 30 psi across its face and allows a flow rate of about 2-3 gpm therethrough. The low pressure coolant water leaking through the No. 1 seal flows up the shaft annulus to the region of the middle secondary sealing assembly.

The middle secondary sealing assembly (or No. 2 seal) is a rubbing face-type seal. Its primary components are a rotating runner and a non-rotating ring. During normal operation, the ring and runner provide a rubbing seal. If the No. 1 seal fails, however, the distribution of pressure on the No. 2 seal runner causes it to act as a spring and deflect in such a way as to provide a film-riding face seal. Most of the coolant water from the No. 1 seal is diverted to the No. 1 seal leakoff. However, a portion of the water passes through the No. 2 seal, leaking at a flow rate of about 2 gph at a pressure drop of from 30 psi to 3-7 psi. The still lower pressure coolant water leaking through the No. 2 seal flows further up the shaft annulus to the region of the upper tertiary sealing assembly.

The upper tertiary sealing assembly (or No. 3 seal) is also a rubbing face-type seal, its primary components being a rotating runner and a non-rotating ring. Most of the flow leaking from the No. 2 seal is diverted by the No. 3 seal out through the No. 2 seal leakoff.

The No. 3 seal typically has one of two forms: either its rubbing face-type seal has a double face or dam with two concentric sealing faces, or it has a single face or dam. In the case of the double dam seal, clean water at a slightly elevated pressure (8-10 psi) over that at the No. 2 seal leakoff (7 psi) is injected as a buffer fluid into the annulus between the two faces or dams such that (1) a portion of this injected flow goes back outward past the outer or upstream one of the seal faces or dams into the housing cavity between the No. 2 and No. 3 seals and then out the No. 2 seal leakoff, and (2) another portion of this injected flow goes in the opposite direction inward past the inner or downstream one of the seal faces or dams and ultimately to a No. 3 seal leakoff to the containment atmosphere. Thus, it is seen that this injection of clean or pure water prevents radioactive gases in the reactor coolant water from passing between the double dams and into the containment atmosphere. On the other hand, in the case of the single dam seal, no injection of clean water is employed. Instead, a portion of the reactor coolant water leaks past the single dam seal and therefrom into the containment atmosphere.

The double dam design permits design control of the hydraulic forces acting on the seal ring by adjustment of the geometry of the noses and the pressure of the injected buffer fluid. The closing forces or nose loads can thereby be tailored to control leakage and to reduce heat generated by the friction in the running seal. In the single nose design there is less latitude in control of the nose load, the body weight of the ring assembly playing the major role in determining the nose load. In some applications of single nose designs the pressure of the sealed fluid may be too low to support adequate leakage to cool the seal. The double dam seal with its buffer fluid injected at a higher pressure assures adequate leakage and cooling.

The double dam-type seal is preferred for its greater flexibility in design as well as for preventing contaminated reactor coolant water from flowing through the No. 3 seal to the containment environment. However, heretofore, the injection water has had to be supplied by a system of external pipes and tubes and internal flow passages. In reactors not originally equipped with such an external system, it is not practical economically to now attempt to retrofit the nuclear power plant so that clean or filtered water can be supplied for injection at the No. 3 seal.

Consequently, a need exists for an alternative means to pressurize the annulus between the noses of the double dam seal which does not require an external supply system.

SUMMARY OF THE INVENTION

The present invention provides a double dam face seal with a self-contained injection pump mechanism designed to satisfy the aforementioned needs. The double dam seal includes one of several versions of injection pump mechanisms of the present invention being adapted to pressurize the annulus of the double dam seal, using reactor coolant water. The injection pump mechanisms are self-contained by the seal, being incorporated by the structure of the seal and require no external supply system.

In one embodiment, the injection pump mechanism of the present invention relates to a flow passage incorporated in the rotating runner with the inlet thereof in communication with the coolant water flow from the No. 2 seal and being-located on a smaller radius of rotation that the outlet of the passage which communicates with the seal annulus. Rotation of the seal runner which rotatably moves the passage and any water filling the same turns the passage and rotating runner into a centrifugal pump, causing a pressure differential along the passage due to centrifugal effects, feeding water via the passage outlet to the annulus between the double dam seal noses, and providing water at a pressure above that at the passage inlet.

In another embodiment, the injection pump mechanism of the present invention relates a pitot tube projecting at an angle from the rotating runner, or a recessed scoop defined in the runner at an angle to, and communicating with a passage having an inlet and outlet at generally the same radius of rotation. The tube or scoop are also at generally the same radius of rotation but extend upstream of the inlet to the passage through the rotating runner. The effect of the tube or scoop rotating with the runner and shaft through the adjacent fluid from the No. 2 seal is to develop a ram or pump pressure higher than the static pressure of the coolant water. This higher pressure, in turn, is supplied by the passage to the double dam seal annulus.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 14 is a view similar to that of FIG. 10, but showing an alternative embodiment of the injection pump mechanism of the present invention incorporated by the runner of the upper tertiary sealing assembly.

FIG. 15 is a fragmentary view of the runner taken along line 15—15 of FIG. 14.

FIG. 16 is a view similar to that of FIG. 14, but showing still another alternative embodiment of the injection pump mechanism of the present invention incorporated by the runner.

FIG. 17 is a fragmentary view of the runner taken along line 17—17 of FIG. 16.

DETAILED DESCRIPTION OF THE INVENTION

Figure 1:
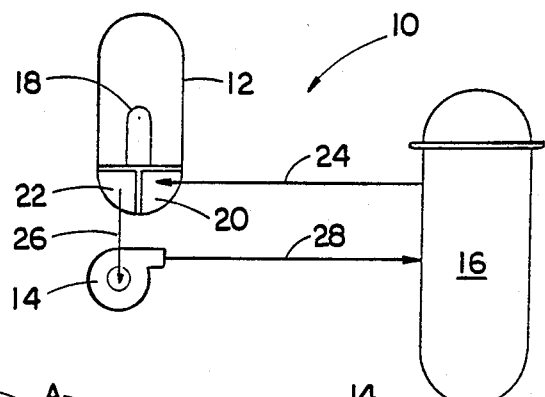
FIG. 1 is a schematic representation of one cooling loop of a conventional nuclear reactor coolant system which includes a steam generator and a reactor coolant pump connected in series in a closed coolant flow circuit with the reactor core.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Prior Art Reactor Coolant Pump

Referring now to the drawings, and particularly to FIG. 1, there is shown a schematic representation of one of a plurality of cooling loops 10 of a conventional nuclear reactor coolant system. The cooling loop 10 includes a steam generator 12 and a reactor coolant pump 14 serially connected in a closed coolant flow circuit with a nuclear reactor core 16. The steam generator 12 includes primary tubes 18 communicating with inlet and outlet plenums 20,22 of the generator. The inlet plenum 20 of the steam generator 12 is connected in flow communication with the outlet of the reactor core 16 for receiving hot coolant therefrom along flow path 24 of the closed flow circuit. The outlet plenum 22 of the steam generator 12 is connected in flow communication with an inlet suction side of the reactor coolant pump 14 along flow path 26 of the closed flow circuit. The outlet pressure side of the reactor coolant pump 14 is connected in flow communication with the inlet of the reactor core 16 for feeding cold coolant thereto along flow path 28 of the closed flow circuit.

In brief, the coolant pump 14 pumps the coolant under high pressure about the closed flow circuit. Particularly, hot coolant emanating from the reactor core 16 is conducted to the inlet plenum 20 of the steam generator 12 and to the primary tubes 18 in communication therewith. While in the primary tubes 18, the hot coolant flows in heat exchange relationship with cool feedwater supplied to the steam generator 12 via conventional means (not shown). The feedwater is heated and portions thereof changed to steam for use in driving a turbine generator (not shown). The coolant, whose temperature has been reduced by the heat exchange, is then recirculated to the reactor core 16 via the coolant pump 14.

The reactor coolant pump 14 must be capable of moving large volumes of reactor coolant at high temperatures and pressures about the closed flow circuit. Although, the temperature of the coolant flowing from the steam generator 12 to the pump 14 after heat exchange has been cooled substantially below the temperature of the coolant flowing to the steam generator 12 from the reactor core 16 before heat exchange, its temperature is still relatively high, being typically about 550 degrees F. To maintain the coolant in a liquid state at these elevated temperatures the system is pressurized by injection pumps (not shown) and operates at pressures of approximately 2250 psi.

Figure 2:
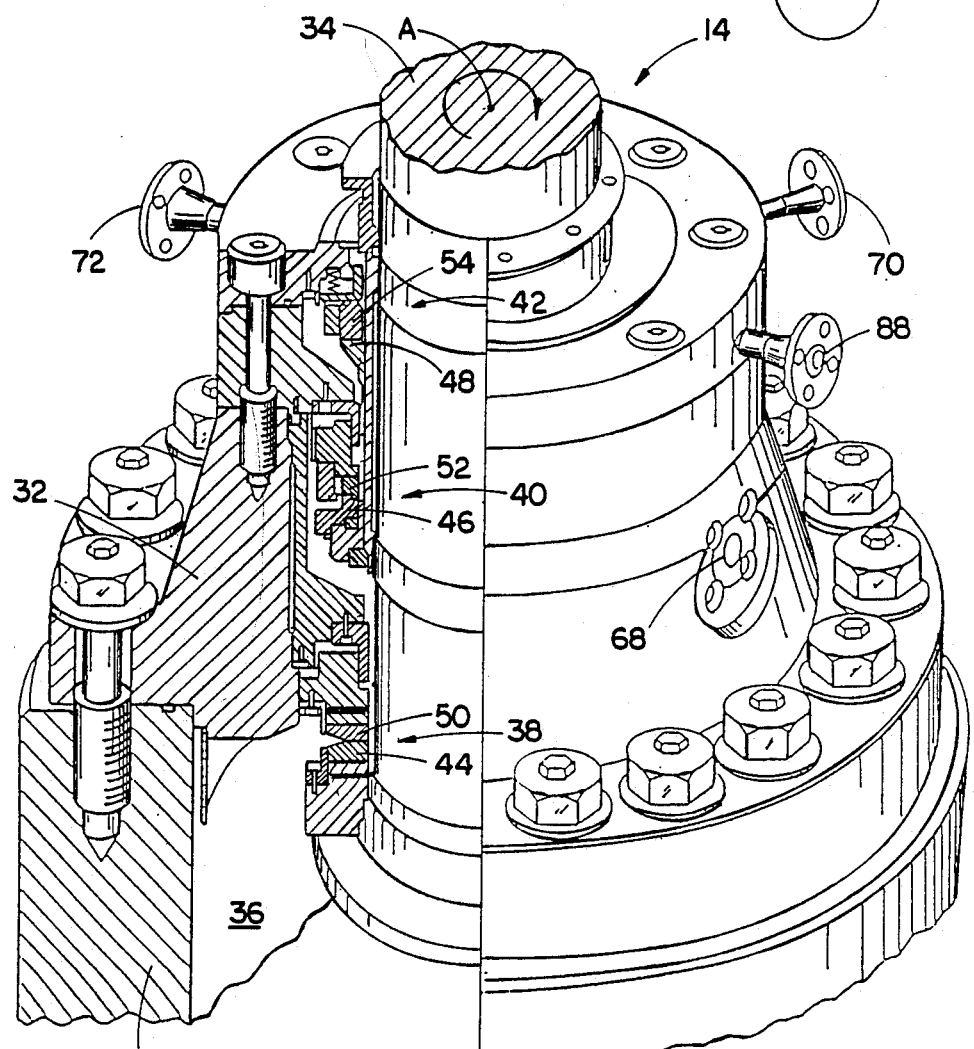
FIG. 2 is a cutaway perspective view of the shaft seal section of a conventional reactor coolant pump, illustrating in cross-section the seal housing and the lower primary, middle secondary and upper tertiary sealing assemblies which are disposed within the seal housing and surround the pump shaft in this section of the pump.
Figure 3:
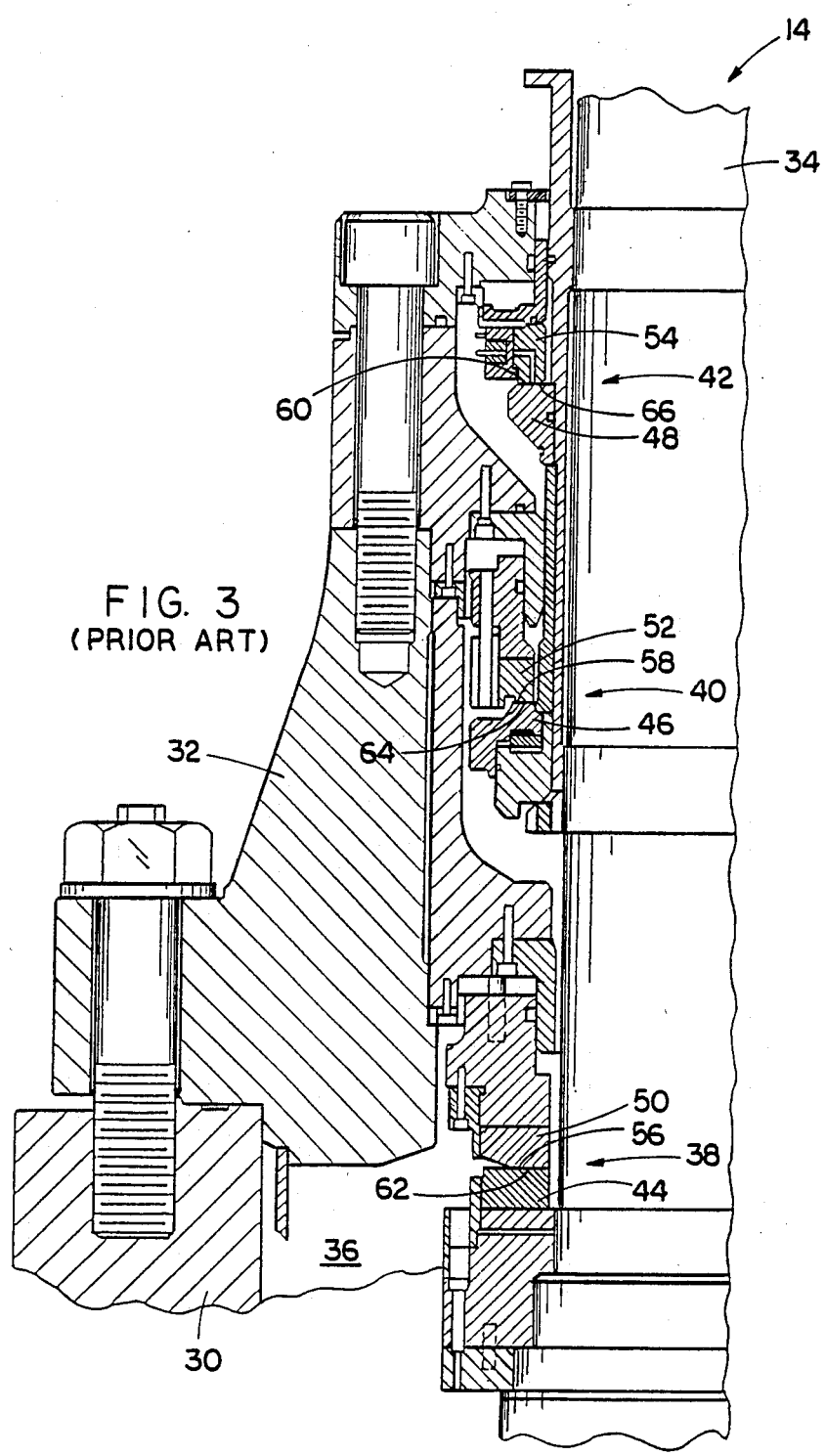
FIG. 3 is an enlarged axial sectional view of the seal housing and sealing assemblies of the reactor coolant pump of FIG. 2.
Figure 4:
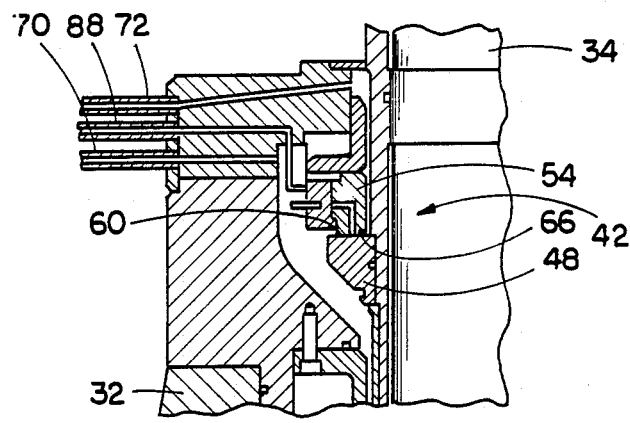
FIG. 4 is an enlarged fragmentary axial sectional view of an upper portion of the sealing housing of the reactor coolant pump of FIG. 3, illustrating the upper tertiary sealing assembly.
Figure 5:
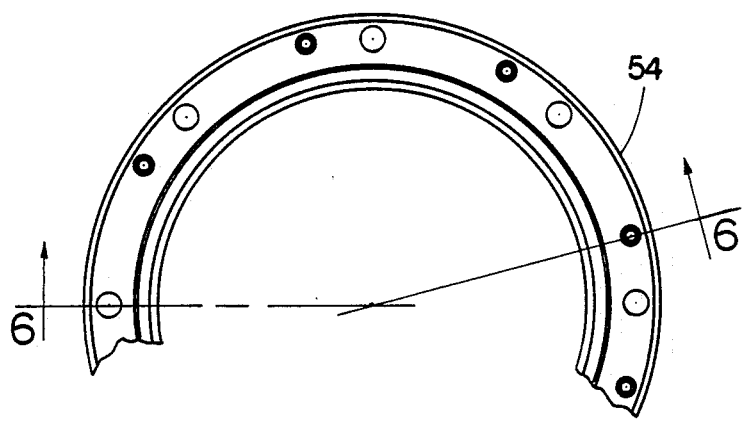
FIG. 5 is an enlarged fragmentary plan view of a non-rotating ring of the prior art upper tertiary sealing assembly having double dams or faces thereon.
Figure 6:
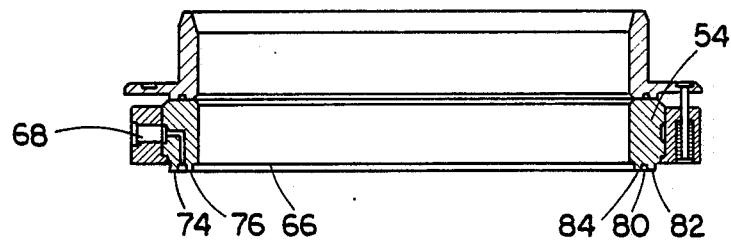
FIG. 6 is an axial sectional view of the prior art double dam seal ring taken along line 6—6 of FIG. 5.
Figure 7:
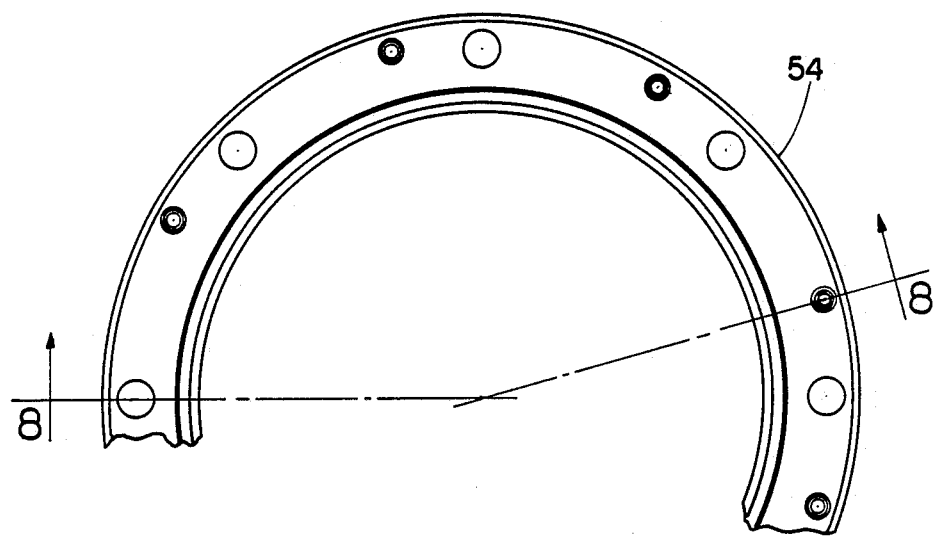
FIG. 7 is an enlarged fragmentary plan view of a non-rotating ring of the prior art upper tertiary sealing assembly wherein the ring has a single dam or face thereon.
Figure 8:
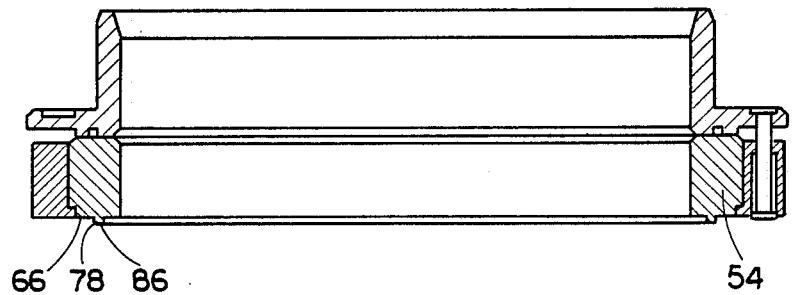
FIG. 8 is an axial sectional view of the prior art single dam seal ring taken along line 8—8 of FIG. 7.
Figure 9:
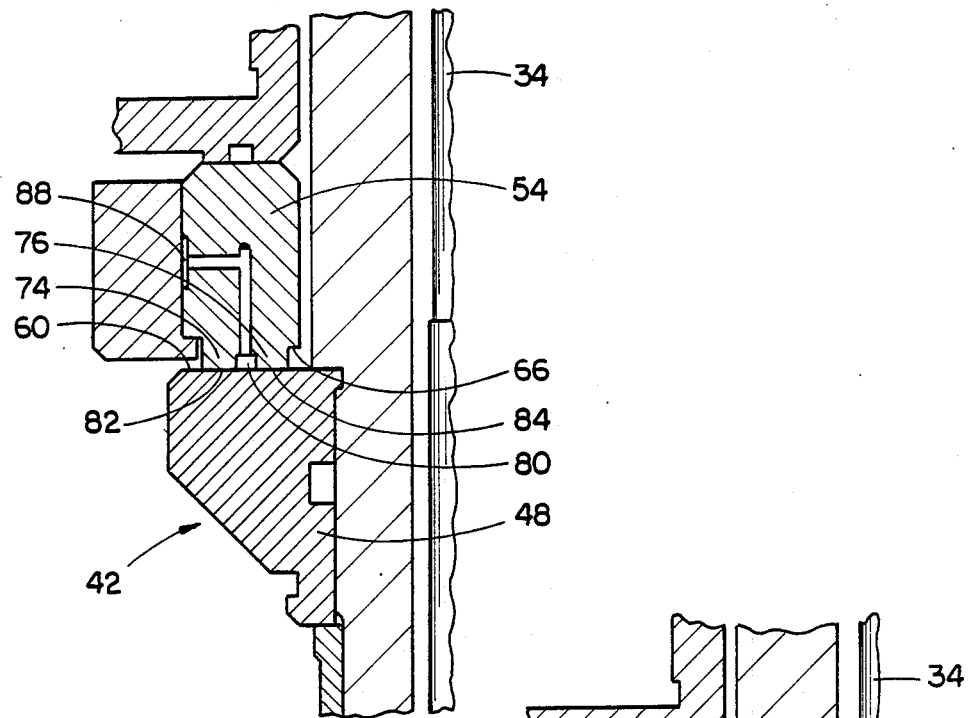
FIG. 9 is an enlarged axial sectional view, on a larger scale than in FIG. 4, of the non-rotating ring and rotating runner of the prior art upper tertiary sealing assembly.
Figure 10:
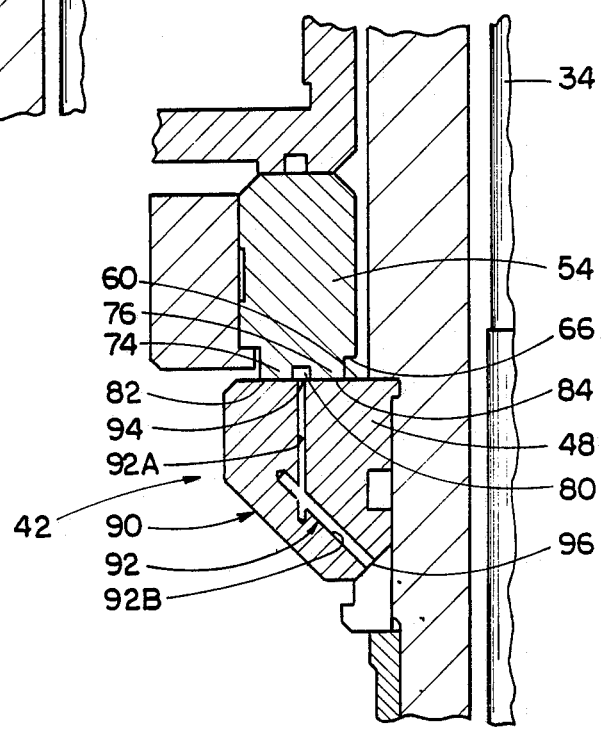
FIG. 10 is a view similar to that of FIG. 9, but now illustrating a non-rotating ring and rotating runner of an upper tertiary sealing assembly, with the runner incorporating one embodiment of the injection pump mechanism of the present invention.
Figure 11:
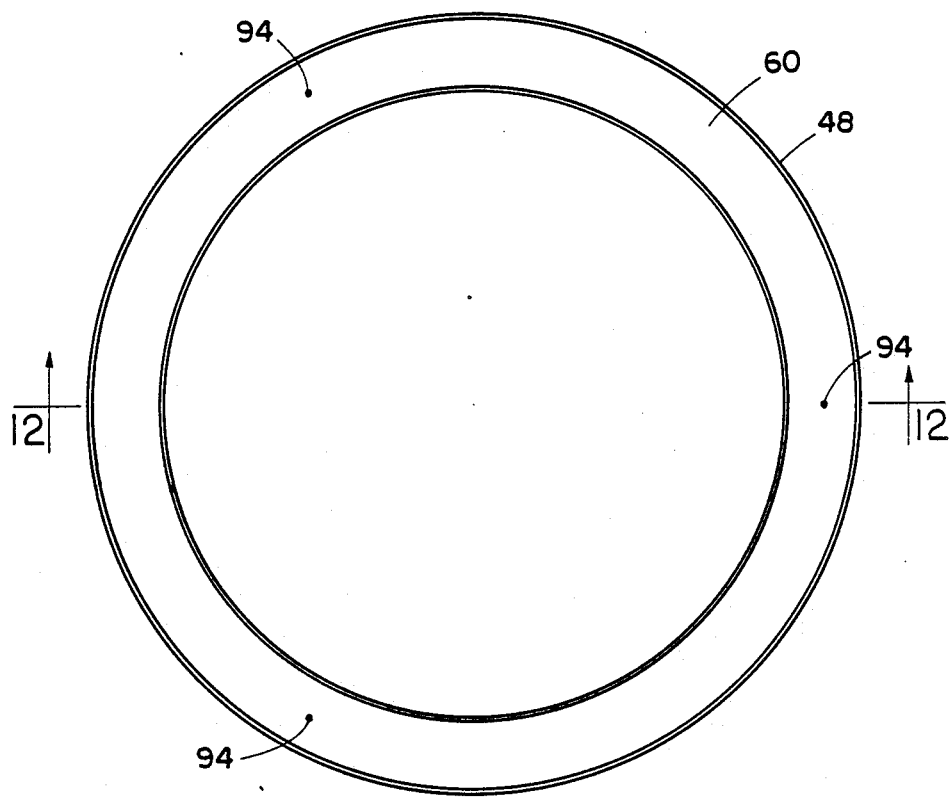
FIG. 11 is a top plan view, on a somewhat smaller scale, of the rotating runner of the tertiary sealing assembly of FIG. 10.
Figure 12:
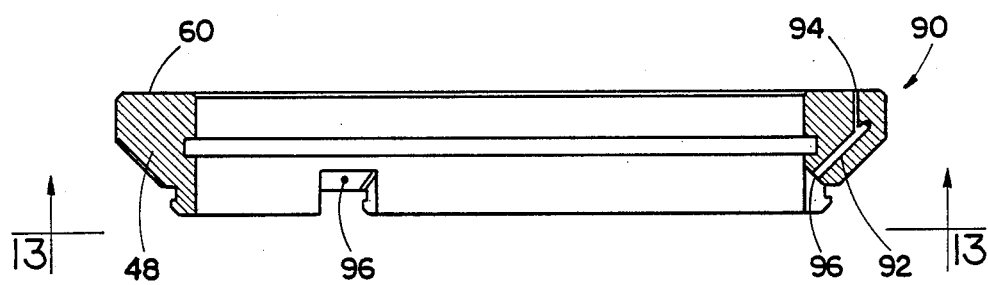
FIG. 12 is an axial sectional view of the runner taken along line 12—12 of FIG. 11.
Figure 13:
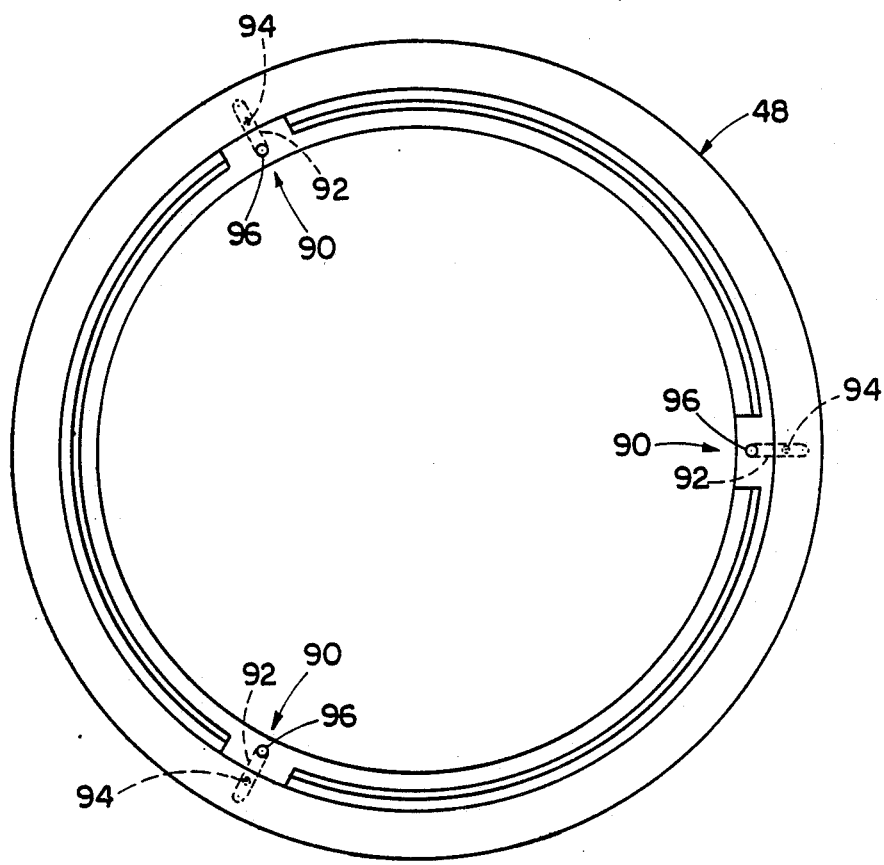
FIG. 13 is a bottom plan view of the runner as seen along line 13—13 of FIG. 12.

As seen in FIGS. 2 and 3, the prior art reactor coolant pump 14 generally includes a pump housing 30 which terminates at one end in a seal housing 32. The pump 14 also includes a pump shaft 34 extending centrally of the housing 30 and being sealingly and rotatably mounted within the seal housing 32. Although not shown, the bottom portion of the pump shaft 34 is connected to an impeller, while a top portion thereof is connected to a high-horsepower, induction-type electric motor. When the motor rotates the shaft 34, the impeller within the interior 36 of the housing 30 causes the pressurized reactor coolant to flow through the reactor coolant system. This pressurized coolant applies an upwardly directed, hydrostatic load upon the shaft 34 since the outer portion of the seal housing 32 is surrounded by the ambient atmosphere.

In order that the pump shaft 34 might rotate freely within the seal housing 32 while maintaining the 2250 psi pressure boundary between the housing interior 36 and the outside of the seal housing 32, tandemly-arranged lower primary, middle secondary and upper tertiary sealing assemblies 38,40,42 are provided in the positions illustrated in FIGS. 2 and 3 about the pump shaft 34 and within the pump housing 30. The lower primary sealing assembly 38 which performs most of the pressure sealing (approximately 2200 psi) is of the non-contacting hydrostatic type, whereas the middle secondary and upper tertiary sealing assemblies 40,42 are of the contacting or rubbing mechanical type.

Each of the sealing assemblies 38,40,42 of the pump 14 generally includes a respective annular runner 44,46,48 which is mounted to the pump shaft 34 for rotation therewith and a respective annular seal ring 50,52,54 which is stationarily mounted within the seal housing 32. The respective runners 44,46,48 and seal rings 50,52,54 have top and bottom end surfaces 56,58,60 and 62,64,66 which face one another. The facing surfaces 56,62 of the runner 44 and seal ring 50 of the lower primary sealing assembly 38 normally do not contact one another but instead a film of fluid normally flows between them. On the other hand, the facing surfaces 58,64 and 60,66 of the runners and seal rings 46,52 and 48,54 of the middle secondary and upper tertiary sealing assemblies 40 and 42 normally contact or rub against one another.

Because the primary sealing assembly 38 normally operates in a film-riding mode, some provision must be made for handling coolant fluid which "leaks off" in the annular space between the seal housing 32 and the shaft 34 rotatably mounted thereto. Accordingly, the seal housing 32 includes a primary leakoff port 68, whereas secondary and tertiary leakoff ports 70,72 accommodate coolant fluid leakoff from secondary and tertiary sealing assemblies 40,42.

The lower primary sealing assembly 38 (or No. 1 seal), the main seal of the pump, causes a pressure drop of coolant fluid from about 2250 psi to 30 psig across its face and allows a flow rate of about 2–3 gpm therethrough. The low-pressure coolant fluid leaking through the lower primary sealing assembly 38 flows up the shaft annulus to the region of the middle secondary sealing assembly 40. At the secondary sealing assembly 40 (or No. 2 seal), most of the coolant fluid from the primary sealing assembly 38 is diverted to the primary leakoff port 68. However, a portion of the fluid passes through the secondary sealing assembly 40, leaking at a flow rate of about 2 gph at a pressure drop of from 30 psig to 3–7 psig. The still lower pressure coolant fluid leaking through the secondary sealing assembly 40 flows further up the shaft annulus to the region of the upper tertiary sealing assembly 42. At the upper tertiary sealing assembly 42 (or No. 3 seal), most of the flow leaking from the secondary sealing assembly 40 is diverted by the tertiary sealing assembly 42 out through the secondary seal leakoff port 70.

Referring now to FIGS. 4-9, it will be seen that the prior art upper tertiary sealing assembly 42 can have one of two forms: either a pair of radially spaced annular outer and inner dams 74,76 or only a single annular dam 78 on the bottom surface 66 of the seal ring 54 facing the top surface 60 of the runner 48. The pair of dams 74,76 define an annular-shaped seal annulus 80 therebetween. In both embodiments, the double dams 74,76 in FIGS. 5, 6 and 9, and the single dam 78 project toward the top surface 60 of the runner 48 and having respective annular faces 82,84 and 86 on their noses being capable of contacting the top surface 60 on the runner 48.

In the case of the tertiary sealing assembly ring 54 having the double dams 74,76, clean water at a slightly elevated pressure (-10 psi) over that at the secondary seal leakoff port 70 (7 psig) is injected as a buffer fluid via injection supply port 88 into the annulus 80 between the two faces 82,84 on the respective dams 74,76. A portion of this injected flow goes back outward past the outer or upstream one of the seal dam faces 82 into the interior 36 of the housing 32 between the secondary and tertiary sealing assemblies 40,42 and then out the secondary seal leakoff port 70. Another portion of this injected flow goes in the opposite direction inward past the inner or downstream one of the seal dam faces 84 and ultimately to a tertiary seal leakoff port 72 to the containment atmosphere. Thus, it is seen that this injection of clean or pure water prevents radioactive gases in the reactor coolant fluid from passing between the double dams 74,76 and into the containment atmosphere.

To keep the seal dam faces 82, 84 and 86, in contact with the runner face 60, the sum of the hydraulic forces, body forces, friction forces and other mechanical forces acting in an axial direction on the ring, with the exclusion of mechanical loads acting through the seal dam faces, must result in a net load which tends to force the ring against the runner. This net closing load is applied via the sealing dam faces to the runner which in turn imparts an equal and opposite reactive force acting on the sealing dam faces thereby making the total of all axial forces acting on the ring zero. This closing force is critical in the operation of the seal, affecting leakage rate and the amount of heat generated due to friction.

Those familiar with the art and in particular the determination of forces acting on the seal elements are aware that the net hydraulic load acting on the ring in the axial direction is the summation of the various pressures acting axially and normal to their respective projected areas. The double dam-type seal offers additional design latitude in that the locations of the seal dams 74, 76 and 78, the areas of the seal dam faces 82, 84 and 86, the area of the double dam-type seal annulus 80, and the pressure of the injected fluid can be varied in the design to obtain hydraulic forces which thereby cause the ring element to be balanced with a desirable closing load. The injection pressure can also be varied and optimized with consideration for its direct effects on the rate of leakage between the seal faces.

On the other hand, in the case of the single dam 78, no injection of clean water is employed. Instead, a portion of the reactor coolant fluid leaks past the single dam seal and therefrom into the containment atmosphere. Single dam seals do not have the same design flexibility as the double dam type, and in specific applications may not permit design for optimal performance. In seals operating at lower pressures, it may not be possible to obtain the hydraulic forces required to counteract body and mechanical forces and provide a reasonable closing load. The closing load acting on the nose can result in excessive heat generation, and insufficient leakage and cooling.

The double dam-type seal is preferred for preventing contaminated reactor coolant fluid from flowing through the tertiary sealing assembly 42 to the containment environment and for its greater design flexibility in balancing forces acting on the seal. However, heretofore, the injection water has had to be supplied by a system of external pipes and tubes and internal flow passages. In reactors not originally equipped with such an external system, it has not been practical economically to attempt to retrofit the reactor so that clean or filtered water can be supplied for injection at the tertiary seal. Thus, a single dam-type tertiary seal has continued to be used.

Double Dam Seal With Self-Contained Injection

In accordance with the present invention, a double dam-type seal can now be retrofitted for the prior single dam-type seal. Although it will not eliminate the leakage of contaminated fluid through the tertiary seal as with clean water injection, it will provide the design flexibility in optimizing the hydraulic loads, inherent to double dam designs, without an external system to supply the injection fluid. Instead of injection of clear water from an external supply, the present invention provides a choice between several different injection pump mechanisms 90 incorporated by the runner 48 of the tertiary sealing assembly 42. Each version of injection pump mechanism 90 causes injection of a portion of the reactor coolant fluid and, thus requires no external supply system. The self-contained injection pump mechanism 90 is adapted to pressurize the annulus 80 between the double dams 74,76 on the seal ring 54 of the tertiary sealing assembly 42 with reactor coolant.

The preferred embodiment or version of the injection pump mechanism 90 shown in FIGS. 10-13 is a flow passage 92 incorporated in the rotating runner 48 of the tertiary sealing assembly 42. The flow passage 92, composed of two branches 92A,92B, has an outlet 94 at one end in communication with the double dam seal annulus 80 and an inlet 96 at the opposite end in communication with reactor coolant flow within the seal housing 32 of the pump 14. The passage inlet 96 is located on a smaller radius of rotation relative to the rotational axis A of the pump shaft 34 (FIG. 2) than the passage outlet 94. Because of this relationship between the locations of the inlet 96 and outlet 94, rotation of the runner 48 which rotatably moves the passage therewith turns the passage 92 and rotating runner 48 into a centrifugal pump, causing a pressure differential in the coolant fluid flowing within and along the passage 92 due to centrifugal effects. Thus, the outlet 94 of the passage 92 feeds the annulus 80 between the noses of the double dams 74,76, providing coolant at a pressure above that at the inlet 96 to the passage 92.

While the radial location of the outlet 94 must be between the two dams 74,76, the location of the inlet 96 may be varied within the geometric limitations of the seal assembly. Changing the inlet location will change the pressure developed thereby allowing the pump to be designed to provide the specific pressure required for a particular seal design or application.

While this design as described above would be used to decrease the net nose load on the seal by providing a higher pressure in the annulus 80, it might also be used to increase the nose load by decreasing the pressure in the annulus below that of the sealed fluid. This would be accomplished by locating the inlet of the flow passage on a radius greater than that of the annulus. In this case the centrifugal effects would tend to draw fluid away from the annulus lowering the pressure.

Alternative embodiments or versions of the injection pump mechanism 90 shown respectively in FIGS. 14 and 15 and in FIGS. 16 and 17 both employ a passage 98 also. The flow passage 98 is defined through the runner 48 and has an outlet 100 disposed at the surface 60 thereon in flow communication with the seal annulus 80 and an inlet 102 disposed at another surface thereon. However, in this version the inlet 102 is disposed at generally the same radius of rotation relative to the shaft rotational axis A as the passage outlet 100. Thus, there is no pumping effect created by the orientation of the passage 98 itself.

In the version of FIGS. 14 and 15, the pumping effect in the injection pump mechanism 90 is created by the disposition of a tube 104 which is connected to and projects at an angle from the runner 48 at the passage inlet 102. The tube 104 is a pitot tube disposed in flow communication with and at generally the same radius of rotation as the passage outlet 100 and inlet 102 but extends upstream of the inlet 102 in flow communication with the coolant fluid contained in the housing 32. Upon rotation of the runner 48 and the tube 104 therewith through the fluid, a pressure differential is produced in fluid flow within and along the tube 104 and passage 98 due to relative motion between the tube and surrounding fluid creating ram effects of fluid flow into the tube 104, resulting in a higher pressure being provided in fluid flow at the passage outlet 100 to the seal annulus 80 than in the coolant surrounding the passage inlet 102.

In FIGS. 16 and 17, another version of the injection pump mechanism 90 is illustrated which utilizes a recessed scoop 106 defined at an inclined angle in the runner 48 instead of the pitot tube 104 of the version of FIGS. 14 and 15. Otherwise the two versions are basically the same with regards to the configuration of the flow passage 98.

As described above, these latter versions are used to decrease the net nose load on the seal by providing a higher pressure in the annulus 80. It might also be configured and used to increase the nose load in situations where that effect is desired. This would be accomplished by decreasing the pressure in the annulus below that of the sealed fluid by modifying the inlet to create and tap a low pressure area, a pressure below that of the sealed fluid, or to produce a venturi effect at the tube or scoop inlet which is opposite to the ram effect. It is readily apparent with respect to all of the versions of the injection pump mechanism illustrated in FIGS. 10-17 that the inlet of the passage of each respective injection pump mechanism is axially displaced from the outlet of the passage. The inlet is located remote from the outlet and on a non-sealing surface of the respective runner different from the sealing surface thereof where the outlet is located.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. For use in a pump having a stationary housing with pressurized fluid therein and a shaft with a rotational axis, a sealing assembly disposable in the housing for sealably mounting the shaft relative to the housing, said sealing assembly comprising:
    (a) an annular runner for circumscribing and mounting around the shaft for rotation therewith;
    (b) an annular seal ring for circumscribing and mounting within the housing in non-rotational relationship thereto;
    (c) said runner and seal ring having respective sealing surfaces facing one another, said sealing surface of one of said seal ring and runner having a pair of radially spaced annular dams formed thereon and defining a seal annulus therebetween, said dams projecting toward said sealing surface of the other of said seal ring and runner and having annular faces thereon capable of contacting said sealing surface on the other of said seal ring and runner, said runner having another, non-sealing surface displaced remote from said sealing surface thereof in a direction parallel to the shaft rotational axis and in a plane separate from the plane of said sealing surface; and
    (d) an injection pump mechanism incorporated by said runner being adapted to receive a portion of the fluid in the housing, to route the fluid portion to said seal annulus and, in response to rotation of said runner with the shaft, to generate a pressure in the fluid portion reaching said annulus that is different than the pressure of the fluid within the housing, said injection pump mechanism including at least one flow passage defined in said rotatable runner, said passage having an outlet disposed at said sealing surface on said runner in flow communication with said seal annulus and an inlet disposed at said non-sealing surface on said runner in flow communication with the fluid within the housing.

2. The sealing assembly as recited in claim 1, wherein said passage inlet is disposed on a radius of rotation relative to the shaft rotational axis being different than a radius of rotation of said passage outlet such that, in response to rotation of said runner and rotational movement of said passage therewith, a pressure differential is produced in fluid flow along said passage due to centrifugal effects and, thus, a different pressure is provided in fluid flow at said passage outlet to said seal annulus than at said passage inlet.

3. The sealing assembly as recited in claim 2, wherein a plurality of circumferentially spaced passages are defined in said runner.

4. The sealing assembly as recited in claim 2, wherein said radius of rotation of said passage inlet is shorter than said radius of rotation of said passage outlet such that the pressure provided in fluid flow at said passage outlet to said seal annulus is greater than at said passage inlet.

5. The sealing assembly as recited in claim 1, wherein scoop extends upstream relative to said passage such that the pressure provided in fluid flow at said passage outlet to said seal annulus is greater than at said passage inlet.

6. In a pump having a stationary housing and a shaft with a rotational axis, said housing containing pressurized fluid, a sealing assembly disposed in said housing for sealably mounting said shaft relative to said housing, said sealing assembly comprising:

(a) an annular runner circumscribing and mounted around said shaft for rotation therewith;

(b) an annular seal ring circumscribing and mounted within said housing in non-rotational relationship thereto;

(c) said runner and seal ring having respective sealing surfaces facing one another, said sealing surface of said seal ring having a pair of radially spaced annular dams formed thereon and defining a seal annulus therebetween, said dams projecting toward said sealing surface of said runner and having annular faces thereon capable of contacting said sealing surface on said runner, said runner having another, non-sealing surface displaced remote from said sealing surface thereof in a direction parallel to the shaft rotational axis and in a plane separate from the plane of said sealing surface; and (d) an injection pump mechanism incorporated by said runner being adapted to receive a portion of the fluid in the housing, to route the fluid portion to said seal annulus and, in response to rotation of said runner, to generate a pressure in the fluid portion reaching said annulus that is greater than the pressure of the fluid in the housing, said injection pump mechanism including at least one flow passage defined in said rotatable runner, said passage having an outlet disposed at said sealing surface on said runner in flow communication with said seal annulus and an inlet disposed at said non-sealing surface on said runner in flow communication with the fluid within the housing.

7. The sealing assembly as recited in claim 6, wherein said passage inlet is disposed on a radius of rotation relative to the shaft rotational axis being shorter than a radius of rotation of said passage outlet such that, in response to rotation of said runner and rotational movement of said passage therewith, a pressure differential is produced in fluid flow along said passage due to centrifugal effects and, thus, a higher pressure is provided in fluid flow at said passage outlet to said seal annulus than at said passage inlet.

8. The pump as recited in claim 7, wherein a plurality of circumferentially spaced passages are defined in said runner.

9. For use in a pump having a stationary housing with pressurized fluid therein and a shaft with a rotational axis, a sealing assembly disposable in the housing for sealably mounting the shaft relative to the housing, said sealing assembly comprising:

(a) an annular runner for circumscribing and mounting around the shaft for rotation therewith;

(b) an annular seal ring for circumscribing and mounting within the housing in non-rotational relationship thereto;

(c) said runner and seal ring having respective sealing surfaces facing one another, said sealing surface of one of said seal ring and runner having a pair of radially spaced annular dams formed thereon and defining a seal annulus therebetween, said dams projecting toward said sealing surface of the other of said seal ring and runner and having annular faces thereon capable of contacting said sealing surface on the other of said seal ring and runner, said runner having another, non-sealing surface displaced remote from said sealing surface thereof in a direction parallel to the shaft rotational axis; and (d) an injection pump mechanism incorporated by said runner being adapted to receive a portion of the fluid in the housing, to route the fluid portion to said seal annulus and, in response to rotation of said runner with the shaft, to generate a pressure in the fluid portion reaching said annulus that is different than the pressure of the fluid within the housing;

(e) said injection pump mechanism including at least one flow passage defined in said rotatable runner, said passage having an outlet disposed at said sealing surface on said runner in flow communication with said seal annulus and an inlet disposed at said non-sealing surface on said runner in flow communication with the fluid within the housing, said passage inlet being disposed at generally the same radius of rotation relative to the shaft rotational axis as said passage outlet;

(f) said injection pump mechanism further including a tube connected to and projecting from said runner at said passage inlet, said tube disposed in flow communication with and at generally the same radius of rotation as said passage but extending away from said passage and terminating at an open end being in flow communication with the fluid in the housing such that, in response to rotation of said runner and said tube therewith through the fluid, a pressure differential is produced in fluid flow along said tube and passage due to effects of fluid flow into said tube and, thus, a different pressure is provided in fluid flow at said passage outlet to said seal annulus than at said passage inlet.

10. The sealing assembly as recited in claim 9, wherein tube extends upstream in the fluid in the housing such that the pressure provided in fluid flow at said passage outlet to said seal annulus is greater than at said passage inlet.

11. For use in a pump having a stationary housing with pressurized fluid therein and a shaft with a rotational axis, a sealing assembly disposable in the housing for sealably mounting the shaft relative to the housing, said sealing assembly comprising:

(a) an annular runner for circumscribing and mounting around the shaft for rotation therewith;

(b) an annular seal ring for circumscribing and mounting within the housing in non-rotational relationship thereto;

(c) said runner and seal ring having respective sealing surfaces facing one another, said sealing surface of one of said seal ring and runner having a pair of radially spaced annular dams formed thereon and defining a seal annulus therebetween, said dams projecting toward said sealing surface of the other of said seal ring and runner and having annular faces thereon capable of contacting said sealing surface on the other of said seal ring and runner, said runner having another, non-sealing surface displaced remote from said sealing surface thereof in a direction parallel to the shaft rotational axis; and (d) an injection pump mechanism incorporated by said runner being adapted to receive a portion of the fluid in the housing, to route the fluid portion to said seal annulus and, in response to rotation of said runner with the shaft, to generate a pressure in the fluid portion reaching said annulus that is different than the pressure of the fluid within the housing;

(e) said injection pump mechanism including at least one flow passage defined in said rotatable runner, said passage having an outlet disposed at said sealing surface on said runner in flow communication with said seal annulus and an inlet disposed at said non-sealing surface on said runner in flow communication with the fluid within the housing, said passage inlet being disposed at generally the same radius of rotation relative to the shaft rotational axis as said passage outlet;

(f) said injection pump mechanism further including an inclined recessed scoop defined in said non-sealing surface of said runner at said passage inlet extending along said non-sealing surface away from said passage and in flow communication with the fluid in the housing such that, in response to rotation of said runner and said scoop therewith through the fluid, a pressure differential is produced in fluid flow along said scoop and passage due to effects of fluid flow into said scoop and, thus, a different pressure is provided in fluid flow at said passage outlet to said seal annulus than at said passage inlet.

12. In a pump having a stationary housing and a shaft with a rotational axis, said housing containing pressurized fluid, a sealing assembly disposed in said housing for sealably mounting said shaft relative to said housing, said sealing assembly comprising:

(a) an annular runner circumscribing and mounted around said shaft for rotation therewith;

(b) an annular seal ring circumscribing and mounted within said housing in non-rotational relationship thereto;

(c) said runner and seal ring having respective sealing surfaces facing one another, said sealing surface of said seal ring having a pair of radially spaced annular dams formed thereon and defining a seal annulus therebetween, said dams projecting toward said sealing surface of said runner and having annular faces thereon capable of contacting said sealing surface on said runner, said runner having another, non-sealing surface displaced remote from said sealing surface thereof in a direction parallel to the shaft rotational axis; and (d) an injection pump mechanism incorporated by said runner being adapted to receive a portion of the fluid in the housing, to route the fluid portion to said seal annulus an, in response to rotation of said runner, to generate a pressure in the fluid portion reaching said annulus that is greater than the pressure of the fluid in the housing;

(e) said injection pump mechanism including at least one flow passage defined in said rotatable runner, said passage having an outlet disposed at said sealing surface on said runner in flow communication with said seal annulus and an inlet disposed at said non-sealing surface on said runner in flow communication with the fluid within the housing, said passage inlet being disposed at generally the same radius of rotation relative to the shaft rotational axis as said passage outlet;

(f) said injection pump mechanism further including a tube connected to and projecting from said runner at said passage inlet, said tube disposed in flow communication with and at generally the same radius of rotation as said passage but extending upstream of said passage and terminating at an open end being in flow communication with the fluid contained in the housing such that, in response to rotation of said runner and said tube therewith through the fluid, a pressure differential is produced in fluid flow along said tube and passage due to ram effects of fluid flow into said tube and, thus, a higher pressure is provided in fluid flow at said passage outlet to said seal annulus than at said passage inlet.

13. In a pump having a stationary housing and a shaft with a rotational axis, said housing containing pressurized fluid, a sealing assembly disposed in said housing for sealably mounting said shaft relative to said housing, said sealing assembly comprising:

(a) an annular runner circumscribing and mounted around said shaft for rotation therewith;

(b) an annular seal ring circumscribing and mounted within said housing in non-rotational relationship thereto;

(c) said runner and seal ring having respective sealing surfaces facing one another, said sealing surface of said seal ring having a pair of radially spaced annular dams formed thereon and defining a seal annulus therebetween, said dams projecting toward said sealing surface of said runner and having annular faces thereon capable of contacting said sealing surface on said runner, said runner having another, non-sealing surface displaced remote from said sealing surface thereof in a direction parallel to the shaft rotational axis; and (d) an injection pump mechanism incorporated by said runner being adapted to receive a portion of the fluid in the housing, to route the fluid portion to said seal annulus and, in response to rotation of said runner, to generate a pressure in the fluid portion reaching said annulus that is greater than the pressure of the fluid in the housing;

(e) said injection pump mechanism including at least one flow passage defined in said rotatable runner, said passage having an outlet disposed at said sealing surface on said runner in flow communication with said seal annulus and an inlet disposed at said non-sealing surface on said runner in flow communication with the fluid within the housing, said passage inlet being disposed at generally the same radius of rotation relative to the shaft rotational axis as said passage outlet;

(f) said injection pump mechanism further including an inclined recessed scoop defined in said non-sealing surface of said runner at said passage inlet and extending along said non-sealing surface upstream from said passage and in flow communication with the fluid contained in the housing such that, in response to rotation of said runner and said scoop therewith through the fluid, a pressure differential is produced in fluid flow along said scoop and passage due to ram effects of fluid flow into said scoop and, thus, a higher pressure is provided in fluid flow at said passage outlet to said seal annulus than at said passage inlet.

* * * * *